United States Patent [19]

von Bonin

[11] Patent Number: 5,182,049
[45] Date of Patent: * Jan. 26, 1993

[54] INTUMESCENCE MEDIA AND THE USE THEREOF

[75] Inventor: Wulf von Bonin, Odenthal, Fed. Rep. of Germany

[73] Assignee: Bayer Aktiengesellschaft, Leverkusen, Fed. Rep. of Germany

[*] Notice: The portion of the term of this patent subsequent to Oct. 1, 2008 has been disclaimed.

[21] Appl. No.: 730,360

[22] Filed: Jul. 15, 1991

[30] Foreign Application Priority Data

Jul. 21, 1990 [DE] Fed. Rep. of Germany ........ 4023310

[51] Int. Cl.$^5$ .................. C04B 20/06; C04B 18/00; C09D 5/16; C09D 5/18
[52] U.S. Cl. .................. 252/378 R; 252/3; 252/602; 252/606; 252/609; 106/18.11; 106/18.14
[58] Field of Search ........... 252/601, 602, 606, 609, 252/8.05, 3, 378 R; 428/469, 470, 472.3; 106/18.11, 18.14, 18.18

[56] References Cited

U.S. PATENT DOCUMENTS

| | | | |
|---|---|---|---|
| 4,230,746 | 10/1980 | Nahta | 427/373 |
| 4,308,197 | 12/1981 | Byrd et al. | 428/272 |
| 4,382,884 | 5/1983 | Rohringer et al. | 252/606 |
| 4,446,061 | 5/1984 | Joyce, III et al. | 252/602 |
| 5,053,148 | 10/1991 | von Bonin | 252/8.05 |

FOREIGN PATENT DOCUMENTS

| | | |
|---|---|---|
| 0245207 | 11/1987 | European Pat. Off. . |
| 3833977 | 4/1990 | Fed. Rep. of Germany . |
| 2359194 | 2/1978 | France . |

Primary Examiner—Mark L. Bell
Assistant Examiner—Michael A. Marcheschi
Attorney, Agent, or Firm—Sprung Horn Kramer & Woods

[57] ABSTRACT

New intumescence media contain ammonium and/or amine salts of acid phosphates of metals of the 2nd and/or 3rd group of the periodic system of the elements and can be employed for a very wide variety of fire prevention purposes.

13 Claims, No Drawings

INTUMESCENCE MEDIA AND THE USE THEREOF

When a fire-preventive material on being exposed to a flame swells up with the formation of a foam which repels the action of the fire, it is called intumescence. In general, intumescence is a desired property of materials for the purposes of fire prevention. Materials which exhibit or effect intumescent behaviour are known as intumescence media.

Many intumescence materials, for example fire-preventive coatings and fire-preventive cements, on exposure to a flame form carbonisation foams, because they contain, as intumescence media, carbohydrates or phenolic, polyurethane or melamine resins in combination with phosphoric acid donors.

Inorganic materials, for example alkali metal silicates containing water, can also foam up on exposure to a flame, and are employed for the purposes of fire prevention. However, since these silicates are sensitive to air, moisture and/or $CO_2$, they can only be used to a limited extent as intumescence media.

In organic intumescence fire-preventive materials in most cases carbonisable compounds in combination with phosphorus compounds act as the intumescence media. The carbonisation foams formed on exposure to a flame have, however, only a low mechanical strength, put up only a low resistance to flame erosion and are degradable by oxidation.

Organic fire-preventive materials of this type can also contain, in addition, aluminium hydroxide, the function of which is to assist the foaming up of the carbonisation melt by splitting off water under the influence of heat, and to carry off heat. The carbonisation of organic melts is promoted by phosphorus compounds which liberate phosphoric acid. Ammonium phosphates are therefore frequently employed as phosphoric acid donors, but their good solubility in water constitutes a considerable disadvantage.

There is, therefore, still a need for intumescence media which are not degradable by oxidation, which are insensitive towards air, moisture and $CO_2$, which on exposure to a flame become effective even at temperatures below 200° C., and which form as far as possible a ceramic intumescent foam having mechanical stability.

Intumescence media have now been found which are characterised in that they contain ammonium and/or amine salts of acid phosphates of metals of the second and/or third group of the periodic system of the elements.

Suitable examples of metals of the second and/or third group of the periodic system of the elements are magnesium, calcium and zinc, but particularly aluminium. Such ammonium and amine salts of acid metal phosphates are not hygroscopic and are suitable for the formation of intumescent foams, although the metal phosphates and ammonium and amine phosphates themselves do not exhibit intumescent properties.

The ammonium and/or especially the amine salts of acid phosphates of metals of the second and/or third group of the periodic system of the elements which contain 1 mol of orthophosphoric acid in the form of $H_2PO_4$ groups per valency unit of the metal are particularly suitable. If appropriate, such salts can also contain attached water (for example water of crystallisation) in the solid state.

Preferred salts are those which have been prepared in an aqueous medium, three moles of orthophosphoric acid having been employed initially for one mole of aluminium hydroxide, an aluminium phosphate having been formed in this manner and this having been reacted with 3–10, preferably 5–10, mol of ammonia and/or amine, relative to one mole of aluminium hydroxide employed.

Also preferred are ammonium and/or amine salts of acid phosphates which correspond to the idealised composition of the formula I

$$Me^n(OPO(OH)_2)_n \cdot xnA \cdot yH_2O \qquad (I)$$

in which
Me denotes a metal of the second or third group of the periodic system of the elements,
n denotes the valency of Me,
x denotes a numerical value between 0.1 and 6,
A denotes ammonia, amine or mixtures thereof and
y denotes an integer from 0 to 12.

In formula (I) Me preferably represents magnesium, calcium, zinc or aluminium, n being 2 in the event that Me=magnesium, calcium or zinc, and n being 3 in the event that Me=aluminium.

It is particularly preferable for Me to represent aluminium and hence for n to represent 3.

x preferably represents a numerical value between 1.5 and 4.5 and y preferably represents an integer from 0 to 6.

A preferably represents mixtures of ammonia and amines or mixtures of different amines or an amine. The amounts of ammonia and/or amine to be employed can, if appropriate, also be selected so that x is greater than 6. Solutions of basic products then result.

The intumescence media according to the invention can, if desired, be combined with other swellable and/or intumescent substances or preparations, for example with intumescence compositions based on polyalcohols, with swellable micas, with graphites, with silicates, with borates and/or with synthetic borosilicates. Such components of the mixture can, for example, be present in such intumescence media combinations in total in an amount of 1% to 99 % by weight.

Suitable components A in formula (I) are not only ammonia, but preferably amines and mixtures of ammonia with one or more amines or mixtures of several amines. Examples of amines are aliphatic amines, such as mono-, di-, tri- and poly-alkylamines having identical or different alkyl or alkylene groups which can, for example, each have 1 to 20 C atoms. The alkyl or alkylene groups preferably each have 1 to 6 C atoms, and the compounds are preferably polyalkylenepolyamines. The following may be mentioned as examples: methylamine, dimethylamine, trimethylamine, monoethanolamine, diethanolamine, triethanolamine, methyl-oleylamine, N-dimethylpropylenediamine, N-aminoalkylpiperazines, ethylenediamine, hexamethylenediamine, melamine, diethylenetriamine, propylenediamine and polyalkylenepolyamines having, for example, 4 to 8 nitrogen atoms, and mixtures thereof with ammonia. Particularly preferred compounds are alkanolamines having a total of 2 to 12 C atoms and a total of 3 to 6 O atoms and, in addition to ethylenediamine, especially polyethylenepolyamines having 3 to 7 N atoms, such as are produced as a by-product in the industrial preparation of ethylenediamine, and mixtures thereof with ammonia.

A particular embodiment of the present invention relates to intumescence media containing, as component A, ethanolamine, ethylenediamine, polyethylenepolyamines having 3 to 7 N atoms or mixtures of these amines with ammonia.

The ammonium and/or amine salts of acid phosphates of metals of the second and/or third group of the periodic system of the elements which are present in intumescence media according to the invention can, in particular, be acid phosphates derived from orthophosphoric acid. However, they can also be derived from other acids containing phosphorus, for example pyrophosphoric acid, polyphosphoric acid, phosphorous acid and phosphinic acids. They are preferably derived from orthophosphoric acid, the stoichiometry being so selected that the metal, for example magnesium, calcium, zinc or aluminium, is not attached to all the acid equivalents present, but free acid equivalents are also present, such as is the case, for example, in the secondary and primary salts of orthophosphoric acid.

The preparation of the ammonium and/or amine salts required for intumescence media according to the invention can, for example, be carried out in the melt, in an anhydrous solvent or, particularly advantageously, in an aqueous medium. In this process it is possible first to prepare acid phosphates, for example by reacting carbonates, oxides or hydroxides of magnesium, calcium, zinc or aluminium with orthophosphoric acid in an aqueous medium, 30% to 75% strength by weight, in particular 45% to 65% strength by weight, phosphate solutions being particularly easy to handle. These solutions can then be reacted, if appropriate with heating or cooling, with pure ammonia, dilute ammonia or ammonia present in an aqueous solution, or amines or mixtures thereof present in a corresponding form. In this regard it is particularly advantageous either to run the acid phosphate solution into previously charged ammonia or amine with thorough stirring, or, in accordance with a preferred industrial embodiment, to feed the acid and the basic component of the reaction mixture in the desired ratio continuously, and, if appropriate, under pressure, to a mixing head, to discharge the mixture therefrom in a form as homogeneously mixed as possible and, if appropriate, to allow it to react to completion in a unit placed downstream. It is also possible to react all 3 reactants together or to react an initially taken acid phosphate solution with ammonia or amines.

45% to 65% strength by weight phosphate solutions can be handled particularly easily, and these are reacted with previously charged concentrated aqueous ammonia or amines to give 30% to 100% by weight preparations. More or less clear solutions can be prepared in a straightforward manner by this procedure in an aqueous medium if large proportions of amine or ammonia are employed, for example with ratios of ammonia or amine in the order of magnitude of 0.5 to 2 base equivalents per free acid equivalent of the phosphate, a ratio which is also used preferentially with polyalkylenepolyamines as the preferred amine.

If the proportion of ammonia or amine is decreased, the tendency of the resulting salts to dissolve is also reduced, and increasingly more viscous preparations are formed, which can, in turn, also change into less viscous dispersions if the proportion of ammonia or amine is 0.5 to 0.8 equivalent.

The intumescence media according to the invention can contain the ammonium and/or amine salts of acid phosphates of metals of the second and/or third group of the periodic system of the elements either in the form of the aqueous preparations thus obtainable or in a dried and, if appropriate, ground form.

Clear, aqueous solutions of the salts are also obtained at pH values above 8 (after the addition of ammonia or amine), but these then can change on drying into water-insoluble forms and non-hygroscopic forms, as a result of which advantageous possibilities of handling and use as intumescence media can arise. It is also possible by varying the proportion of ammonia and/or amine to produce transition states between solutions and gels, the rheology of which can be adapted to the particular method of use. At a given solids content, clear solutions of low viscosity, lard-like and gel-like states and stable dispersions can be obtained. These various states and preparations can be used as such or can be converted by drying, preferably at temperatures below 180° C. and especially at temperatures of 45° to 120° C., into solids which can, if appropriate after grinding, be used as pulverulent or granulated intumescence media.

Drying can be carried out under reduced or normal pressure. In the course of drying the ammonium and/or amine salts of acid phosphates of metals of the second and/or third group of the periodic system of the elements change, in some cases with the partial elimination of ammonia or amine, into forms which are stable to water. They are then not redissolved if they come into contact with water or are stored in water.

The aqueous or dried pulverulent or granulated or other preparations of ammonium and/or, in particular, amine salts of acid phosphates of metals of the second and/or third group of the periodic system of the elements can be processed, if appropriate with aqueous binders, to give, for example, impregnations, mortars, cements, paints and coatings which can be used in the field of fire prevention. Clear gels, a particular form of aqueous preparations of these salts, in particular with ethanolamine as the amine component, can be suitable for use as an interlayer in fire prevention glazings and as a flexible fire prevention coating or impregnation in soft foams.

Dry powders can also be employed as fire-extinguishing powders or can be incorporated in paints, cements or coatings as pigments which impart intumescent fire-resistance. They can similarly be incorporated into resins, for example into optionally foamed epoxide resins, polyester resins, silicone resins, polyurethane resins, phenolic resins or other resins of this type, in order to improve their behaviour in fire. They can also be incorporated into thermoplastics, such as polyethylenes, polypropylenes, polyesters, polyacrylonitriles, polyurethanes, acrylonitrile/butadiene/styrene polymers, polyvinyl chloride, polystyrenes, polycarbonates, polyvinyl ethers and polysulphides, and also into rubber mixtures (for example those based on polydienes), into ethylene copolymers with propylene, acrylates or vinyl esters or into polymer blends or into foams, for example into foams based on polyurethanes, or into mixtures for recycling. Finally, it is also possible to compress mixtures of intumescence media according to the invention with wood shavings to give chipboard. Intumescence media according to the invention and solutions or dispersions thereof (for example in water) are equally suitable as binders for sheets and mouldings of glass and mineral wool.

In general, the higher the proportion of intumescence media according to the invention the better the fire-preventive action is.

The intumescence media according to the invention can, if desired, be employed combined with other intumescence systems and/or fire-preventive materials.

In general, contents of 10% to 50% by weight are to be desired. Even larger proportions can be suitable in individual cases, for example contents of 50% to 70% by weight, and also ratios below those % by weight, for example 3% to 10% by weight. These ratios relate to the content of intumescence media according to the invention in the mixture with other intumescence systems and/or fire-preventive materials.

The fire-preventive action of preparations containing intumescence media according to the invention correlates with the behaviour of the intumescence media when exposed to a flame or heated. In general, the substances soften in the range between 100° and 250° C. and form a melt which initially becomes more liquid as the temperature increases. This melt begins to decompose with the evolution of gas and an increase in viscosity from approx. 150° to 200° C., with the formation of an intumescent foam which becomes more stable as the temperature rises and finally solidifies to give a heat-resistant ceramic moulding. In the presence of organic matrix substances or binders, the carbonisation and encrustation of the latter is promoted by the ceramic-forming intumescence media.

At the stage of incipient softening or melting the intumescence media can also be shaped as thermoplastics, it being possible to obtain solid glass-like mouldings which can be used, for example, as special optical glasses or which can, if desired, additionally be reinforced, for example with carbon fibres, glass fibres, mineral fibres or fillers. Mouldings of this type can then in turn foam up further when exposed to a flame and can become effective as fire-preventive elements, for example in cable partitions or switch boxes.

It is also possible, for example by mixing the aqueous preparations or powders of the intumescence media according to the invention, to combine the latter with fibres, for example carbon fibres, glass fibres, metal fibres or mineral fibres, or with fillers, for example fillers based on crushed rocks, chalk, quartz, glasses, metal powders or carbon, and then to foam them up by a heat treatment rising from 200° to 600° C. or, if appropriate, even higher. In this way it is possible to obtain mineral foams of good resistance to water and heat having bulk densities between 0.1 and 0.9 g/cm$^3$ and mouldings with corresponding properties.

In this connection particular interest attaches to the combination of the intumescence media according to the invention with swellable graphites, for example with graphite compounds which contain $NO_x$ and/or $SO_x$ and which expand, on heating to approx. 150° to 600° C., to several times their initial volume.

Combinations of this type are readily accessible by mixing the aqueous preparations of the intumescence media according to the invention with swellable graphites the particle size of which can be, for example, 0.1 to 5, preferably 0.5 to 3, mm, and subsequent drying or by merely mixing dry intumescence media according to the invention in the form of powder with the swellable graphites. Combinations of this type can be foamed, for example at 150° to 700° C., preferably at 200° to 600° C., to give mechanically stable light mouldings, and can contain, for example, 1 to 99, preferably 15–85, % by weight of the intumescence media according to the invention. The bulk densities of such light mouldings can be, for example, between 0.03 and 0.9 g/cm$^3$. They are preferably between 0.09 and 0.3 g/cm$^3$.

In these combinations of aqueous formulations of the intumescence media according to the invention with swellable graphites the intumescence medium functions as a binder, which is similarly swellable, for the swellable graphite, so that on drying during shaping solid swellable mouldings can be obtained which can also be used for fire-preventive purposes or as precursors of foam mouldings. Similarly useful, solid, thermally foamable mouldings can be obtained if mixtures of intumescence media according to the invention are compressed in powder form with swellable graphites at temperatures between, for example, 100° and 250° C.

It is also possible to introduce the granulated combinations of swellable graphite and intumescence media according to the invention either in an existing solid shape or preferably in a pre-expanded shape into the moulds, which are closed but permeable to the expansion gases, and then to cause the foaming and swelling processes to proceed to completion by the application of heat, with the formation of a light moulding.

It is noteworthy in this connection that an unexpectedly effective stabilisation of the graphite against oxidation at temperatures up to approx. 800° C. is effected by the combination of the swellable graphite with intumescence media according to the invention. Whereas mouldings composed of pure swellable graphite are destroyed at 700° C. in a very short time by oxidation in air, no essential oxidative degradation (determined gravimetrically or mechanically for example) can be detected even after hours when, for example, 20% to 45% by weight of intumescence media according to the invention are present.

Very generally, intumescence media according to the invention have the advantages that they are frequently not sensitive to air, moisture and carbon dioxide, offer resistance to erosion by flame if ceramic-like intumescent foams are well formed, can be prepared in a sparingly water-soluble or water-insoluble form and, even at temperatures below 300° C., can form a ceramic intumescent foam which is mechanically and thermally resistant.

In the following, unless otherwise stated, parts and percentages refer to weight.

EXAMPLES

AP solution denotes a 50% to 52% strength aqueous solution of the salt formed from one mole of aluminium hydroxide and three moles of orthophosphoric acid, which is clear and mobile.

EXAMPLE 1

100 parts of AP solution and a mixture of 10 parts of ethylenediamine and 50 parts of 24% strength aqueous ammonia solution were introduced simultaneously into a reaction vessel with vigorous stirring. In the course of this a gel-like precipitate was initially formed, and this dissolved on warming with the formation of a clear solution. On cooling to room temperature overnight the clear solution solidified and returned to the liquid state on being heated to 55° C.

The solution can be used as such, in the solidified or liquid state, as a binder for binding swellable graphite powders, ceramic powders and ceramic fibres and also as a pigment in fire-preventive paints.

a) The solution obtained above was evaporated to dryness at 80° C. and was subsequently dried at 120° C., in the course of which a glass-like, brittle material which was not hygroscopic (water absorption in the ambient air less than 3% by weight) was formed. The product thus obtained was finely ground for 19 hours in a ball mill. 80 parts of the powder thus obtained were then mixed with 50 parts of commercially available boat paint and 50 parts of white spirit. The coating agent thus obtained was brushed onto a pinewood panel in such a way that a coating 1 mm thick was obtained after drying. When exposed to a flame, the pinewood panel was effectively protected against bursting into flame because a hard layer, several mm thick, of a ceramic-forming intumescent foam formed out of the coating.

b) 200 parts of the dried powder obtained as described in a) were incorporated on a roll at 80° C. into 100 parts of an elastomeric, commercially available ethylene/vinyl acetate copolymer (Levapren ®, Bayer AG), in the course of which a flexible, opaque plastic material was formed, which did not burn further when exposed to a flame, had an LOI index of over 65 and formed a ceramically hard intumescent foam when exposed to a flame. A material of this type can be used for the preparation of cable sheathing.

c) 100 parts of the powder obtained in accordance with a) were mixed with 60 parts of commercially available glass fibres (milled fibres) and were compressed in a compression mould heated to 160° C. under 25 bar to give 0 rings which had an inner width of 0.5 cm, an external diameter of 1.45 cm and a thickness of 1.2 cm. They were incorporated in a switch box to protect cable leads, and, when exposed to flame, produced an intumescent foam which closed with foam the apertures around the cable, exuded no tar-forming or corrosive gases and remained virtually smoke-free.

d) 120 parts of the ground powder obtained as described in a) were mixed into a mixture of 100 parts of a glycerol-initiated polyether formed from ethylene oxide and propylene oxide and having an OH number of 251, 2 parts of dimethylbenzylamine and 0.5 part of water. This mixture was then stirred at room temperature with 63 parts of 4,4-diphenylmethane diisocyanate to give a homogeneous mixture. When heated, the mixture foamed in the course of a few minutes to give a foam having an elastic character and a bulk density of about 130 kg/m$^3$.

A circular disc of diameter 10 cm and thickness 1.5 cm cut from this foam was mounted over a Bunsen flame operated by natural gas in such a way that the blue cone of the flame was 5 mm below the surface of the foam. When exposed to this flame, the foam only burned over the Bunsen flame. As soon as the latter was removed, the flame died out in a few seconds.

Flaming was continued for 90 minutes at the full capacity of the Bunsen burner, but the circular disc did not burn through. After the flaming it was found that the foam had turned into a foam-like, blackened, ceramic-like material and that flame penetration had in this way been effectively prevented.

e) 150 parts of the ground product obtained in accordance with a) were stirred into a mixture of 100 parts of the polyether also used in d) and 61 parts of 4,4-diphenylmethane diisocyanate. A thixotropic, brushable mixture was formed, and this was applied in a thickness of 4 mm to a double-T steel girder. The coating was tack-free after 5 hours at 20° C. and completely cured within 2 days.

After 14 days the girder was built into a small burning chamber built on the model of DIN 4102 and was exposed to flame in accordance with the burning curve of DIN 4102. After one hour the test was discontinued and the girder, the maximum temperature of which in the flaming region had reached 650° C., was dismantled. It was found that the girder was then completely enveloped in a ceramicised foam layer the thickness of which varied between 1.5 and 3 cm and which did not peel off during the exposure to flame, but only when the girder was cooled.

f) 75 parts of commercially available $NO_x$ swellable graphite were made into a paste with 50 parts of a solution obtained from 100 parts of AP solution and a mixture of 20 parts of ethanolamine and 80 parts of 24% strength aqueous ammonia solution. This mixture was dried at 80° C. and was then granulated. A square plate of side length 10 cm and weight 20 g was compressed from the granules in a platen press at 125° C. This plate, which had a good mechanical strength at room temperature, was placed in a steel closed mould in order to prepare plates of dimensions 10×10×2 cm containing a double layer of writing paper as separating layer. The mould was then heated at 600° C. for one hour. After cooling, a light-weight plate having covering layers of carbonised paper was taken out of the mould. The plate was mechanically stable, had a bulk density of 0.1 g/cm$^3$ and was of a non-brittle, ductile character. Plates of this type can be used as a protection against heat, a sandwich core and a protection against electromagnetic waves.

g) 20 parts of granules obtained in accordance with f) were heated at 600° C. in the platen mould also used in f). A cube of side length 2 cm was cut from the plate thus obtained and was heated at 700° C. in an oven with the admission of air. After 2 hours the cubic shape was still completely retained.

A cube of equal size, but prepared from expanded swellable graphite was completely reduced to ashes after similar treatment in the oven.

h) Ground product powder obtained in accordance with a) was compressed at 150° C. on a platen press to give a plate measuring 10×10×0.5 cm. A cube cut from this plate having a side length of 0.5 cm was heated on a wire gauze from below with a natural gas Bunsen flame. In the course of this the cube softened and then decomposed with swelling, and, after the completion of the decomposition reaction and the gas evolution associated therewith, a ceramic-like intumescent foam was formed, which assumed a volume of about 400% (relative to the original cube).

This indicates that powders obtained in accordance with a) are suitable for the preparation of fire-preventive cements which become ceramic in the event of fire. Fire-preventive cements of this type can be prepared by making aqueous binders based on cellulose derivatives, rubbers, silicones, kneadable polyolefin waxes, plastic latices (dispersions), bitumen or polyisobutylene into a paste with such intumescence powders.

i) Test f) was repeated, the plate of starting material (20 g) being first comminuted and pre-expanded at 205° C. The pre-expanded material was then filled into the mould and subsequently heated at 600° C. A light-weight plate having properties comparable to the plate obtained in accordance with f) was obtained.

EXAMPLE 2

150 parts of AP solution were stirred, with thorough stirring, into a mixture of 10 parts of ethanolamine, parts of aminoethylpiperazine and 80 parts of 25% strength aqueous ammonia. A weakly basic, creamy and readily brushable preparation of the salt formed was obtained after prolonged stirring.

100 parts of this preparation were stirred with 25 parts of a 50% strength commercially available polyacrylate latex (Acralen ® AFR, Bayer AG) to form a brushing paint and were pigmented with 5 parts of a titanium dioxide coloured pigment. When substrates coated with the fire-preventive paint thus prepared were exposed to flame, a firmly adhering, ceramicised and flame-repelling protective layer was produced.

The brushable preparation of the salt formed was dried at temperatures of up to 110° C., producing a brittle, easily grindable material which can be used analogously to Example 1 a) to 1 h) and leads to comparable results.

EXAMPLE 3

A mixture of 10 parts of triethylenetetramine and 90 parts of 24% strength aqueous ammonia solution was stirred with 200 parts of AP solution, and the mixture was homogenised at 60° C. by means of a "siren" mixer. A viscous, readily brushable dispersion was obtained after cooling with stirring. Wood was painted and paper and cardboard were coated with this dispersion. On exposure to flame, a ceramicised intumescent foam which imparted good protection against fire was formed in each case.

A brittle glass was obtained from the dispersion by drying, and was ground. Powder prepared in this manner can be used analogously to Examples 1 a) to 1 h) and leads to comparable results.

EXAMPLE 4

100 parts of an aqueous amine solution according to Example 3 were stirred with 300 parts of AP solution, and the mixture was homogenised at 70° C. in a "siren" mixer. A salt/gel dispersion which had a higher viscosity than that of Example 3, but was still brushable, was obtained in this way. Drying and grinding this dispersion gave a powder which can be employed analogously to Examples 1 a) to 1 h) and led to comparable results.

All the powders according to Examples 1, 3 and 4 were not hygroscopic (water absorption less than 3% by weight in 7 days at room temperature and 60% relative humidity).

EXAMPLE 5

400 parts of AP solution were stirred thoroughly at 80° C. with 100 parts of ethylenediamine,. A clear, basic product solution was obtained and this on drying gave a brittle, easily grindable product. The product powder was not hygroscopic and, on exposure to flame, intumesced without appreciable evolution of smoke to approx. 400% by volume with the formation of a hard, strong intumescent foam. The product solution was used analogously to Example 3 for painting wood; the product powder was processed analogously to Example 1 a) to give a paint which was used to paint pinewood and, analogously to Example 1 d), to prepare a foam. Effects analogous to those described in the examples indicated were found in each case on exposure to flame. In this case the intumescence was more pronounced.

EXAMPLE 6

The procedure was as in Example 5, but 500 parts of AP solution were employed. The resulting clear product solution was considerably more viscous than that of Example 5 and solidified on cooling. A foam prepared analogously to Example 5 or 1 d) was tested as described in Example 1 d) and prevented the penetration of flame effectively.

EXAMPLE 7

450 parts of AP solution were stirred at 90° C. with 100 parts of a commercially available technical mixture of higher polyethylenepolyamines (Polyamin B 433, Bayer AG). A viscous, clear product solution which solidified to give a clear gel on cooling was obtained. Drying and grinding gave a product powder which could be processed as a thermoplastic at 120°-200° C. and which, on exposure to flame, produced an expansion to 500% by volume, with the formation of a hard, stable, flame-repelling intumescent foam. The powder can therefore be used as an intumescence medium for fire-retardant paints, cements, plastics and foams. Only minor amounts of smoke were formed on exposure to flame.

The powder was compressed in a heatable press under vacuum at 150° C. and 160 bar to give a plate 5 mm thick. In the hot state this plate was flexible. It can therefore be deep-drawn, bent, welded or processed to give specially shaped elements which can be used, in particular, in the field of electrical installation. In addition, it can be used for the preparation of optical windows, lenses and light-conducting elements, particularly if the amine employed has been rendered colourless, for example by previous distillation.

A foam was also prepared from the powder analogously to Example 1 d), and, in a test analogous to Example 1 d), gave analogous results.

EXAMPLE 8

100 parts of AP solution were vigorously stirred at 15° C. with 60 parts of melamine. After a short time a solid cake was formed, which was comminuted, dried and ground. 120 parts of the product powder thus obtained were incorporated into a foam analogously to Example 1 d). Exposing a circular disc of this type of foam to flame analogously to Example 1 d) showed the resistance of the foam to burning through.

Layers of such a flexible foam of a thickness of a few mm are suitable for use as a fire-preventive layer for foam cushions and foam seats.

EXAMPLE 9

400 parts of AP solution were stirred thoroughly at 85° C. with 100 parts of ethanolamine. This gave a water-clear solution which was readily flowable at 80° C. and which, on cooling, solidified to form a high-viscosity, gel-like product which was also water-clear. This preparation can be used as an intermediate layer in gel-containing fire-preventive glazing.

After drying at 120° C. the gel turned into a plastic mass which can be mixed with glass fibres and be used as a fire-preventive cement.

On exposure to flame the plastic material decomposed and, without appreciable formation of smoke, formed a hard, fire-repelling intumescent foam, with an expansion to approx. 700% by volume.

EXAMPLE 10

100 parts of ethanolamine were vigorously stirred at 90° C. with 500 parts of AP solution. A virtually clear, highly viscous, flowable solution was formed, which was gel-like at room temperature. This solution was boiled for 3 minutes under reflux in the course of which it assumed a brushable character, even at room temperature.

a) This solution dried with the formation of a clear film which was tack-free when dry, which makes it suitable as a coating material for textile structures which are intended to be given a flame-retardant coating without losing their flexibility.

Wood, paper, cardboard, the surface of a polyurethane soft foam and an aluminium sheet were coated with this solution. On exposure to flame, a hard, fire-repelling intumescent foam was formed in each case.

100 parts of this solution were kneaded with 30 parts of glass fibres (MF glass fibres made by Bayer AG) and the product was dried. The dried material was granulated.

40 parts of the granules were poured into a platen mould in accordance with Example 1 f) and were heated at 600° C. for 60 minutes in this mould. A ceramicised plate of the intumescent foam formed, which had a bulk density of 0.2 g/cm$^3$, was then taken out of the mould. It had a dark coloration as a result of the carbon content, could be machined and was water-resistant, remaining stable for 7 days when stored in water at room temperature.

b) Diluting the solution with water in a ratio of 1:1 results in a low-viscosity, brushable, thixotropic gel dispersion into which it is easily possible to incorporate glass fibres or pigments.

A pigment particularly suitable for obtaining fire-repelling mortars and coatings was obtained by mixing equal parts of concentrated aqueous ammonia and AP solution and subsequently drying at 100° C.

c) The product solution was dried at 80° C. by the thin layer process, giving a material which could be processed as a thermoplastic. This was mixed with 15% of glass fibres at 160° C. and was applied, in the form of a layer 1.5 mm thick, to a cotton nettle cloth by means of melt-calendering. The cloth retained its flexibility. On exposure to flame, it did not burn, but, at the point of flaming, a ceramicising intumescent layer was formed which prevented the penetration of fire. On being exposed to flame, the dry, plastic, mouldable product began initially to soften and then to foam up with evolution of gas and with the formation of a hard, ceramicised intumescent foam with an expansion of approx. 700% by volume.

d) The product solution was mixed with swellable graphite analogously to Example 1 f) and was processed to form a plate as described there. On exposure to flame the expanded particles of swellable graphite held together well and did not form dust.

e) The pH of 100 parts of the product solution was adjusted to a value of 7.5 with ammonia and the product was kneaded at room temperature with 100 parts of a 50% strength commercially available dispersion of a soft butadiene/styrene copolymer (Baystal® P 1300, Bayer AG). A fire-preventive cement which was readily suitable for cartridges and which was used for filling joints in an elastic manner was obtained. When the joint was exposed to flame, a ceramicising intumescent foam which prevented the penetration of fire was formed.

EXAMPLE 11

The procedure was analogous to Example 9, but diethanolamine was used instead of ethanolamine. This gave a product solution which, in respect of processibility and fire-prevention, had properties analogous to those of the product from Example 9. A test in accordance with Example 10 b) produced an analogous formation of intumescent foam.

EXAMPLE 12

1 mol of $Ca(OPO(OH)_2)_2$ in the form of a 50% strength aqueous solution was thoroughly stirred with 125 g of ethanolamine. A viscous mixture was formed, and this was dried at 120° C. A sphere about the size of a pea was removed from the resulting plastic material and was exposed to flame on a wire grid by means of a Bunsen flame. A hard, fire-resistant intumescent foam was formed, with an expansion to about 400% by volume.

EXAMPLE 13

0.5 mol of $Mg(OPO(OH)_2)_2$ in a 50% strength aqueous solution was thoroughly stirred with 62 g of ethanolamine. The resulting product mixture was dried at 120° C., and a material which was plastic at elevated temperatures was thus obtained. On exposure to flame a hard intumescent foam, stable to flame, was formed, with an expansion to about 300% by volume.

EXAMPLE 14

1 mol of $Zn(OPO(OH)_2)_2$, in the form of a 60% strength aqueous solution, was stirred with 0.5 mol of ethylenediamine, 1.0 mol of ethanolamine and 250 ml of 23% strength aqueous ammonia, and the resulting mixture was dried at 100° C. A readily grindable, brittle product was obtained. On exposure to flame this product expanded by approx. 300% by volume, with the formation of a ceramicised intumescent foam. The powder is suitable for the preparation of protective coatings (analogously to Example 1 a) and for rendering mixtures of elastomers suitable for the production of cable sheathing (analogously to Example 1 b).

EXAMPLE 15

312 parts of aluminium hydroxide were dissolved in 1,120 parts of water at 90° C. and 1,392 parts of 85% strength orthophosphoric acid. 39 parts of ethanolamine were added to 100 parts of this solution, a viscous solution of the corresponding aluminium/ammonium phosphate being formed (approx. 60% strength by weight).

540 parts of a customary chip mixture, such as is employed for the surface layer of wood chipboard (pinewood surface layer chip, 6% moisture), were mixed with 100 parts of this solution on a Lödige mixer. The chip mixture to which the aluminium/ammonium phosphate solution had been added was then compressed on a heated daylight press at 175° C. and 35 bar to give plates 1.2 cm in thickness. The compression time was 15 minutes.

After cooling, the resulting plates proved dimensionally stable, and they can be nailed and screwed. Their strength is adequate for purposes of fire prevention.

On exposure to a Bunsen flame, it was found that they have no tendency to burn or afterglow, and that a fire-retardant and insulating carbonising structure is formed.

EXAMPLE 16

The procedure was as in Example 15, but 40 parts of the amine mixture as in Example 7 were used instead of 39 parts of the ethanolamine. A chipboard sheet was prepared in a manner analogous to that of Example 15. This exhibited properties analogous to those of the chipboard sheet produced in accordance with Example 15.

EXAMPLE 17

100 parts of AP solution were stirred at 70° C. with 100 parts of 24% strength aqueous ammonia solution to give a clear solution. 20 parts of the amine mixture as in Example 7 were then added and the mixture was again stirred to give a clear solution. This was sprayed on as a binder in the production of mineral wool sheets so that a binder content of 2.5% by weight resulted A good binding of the fibres resulted, which, in contrast with phenolic resin binders customarily used, introduced virtually no fire load. If necessary, the binder solution can be freed from excess ammonia by stripping, and there is then virtually no further odour nuisance.

Comparable results were obtained if a solution, according to the invention, as in Example 10 b) was used in the preparation of the binder.

EXAMPLE 18 a) 100 parts of AP solution were stirred with 100 parts of 24% strength aqueous ammonia to give a clear solution. This was dried at 120° C. A colourless powder, which was ground further in a ball mill, was obtained.

b) 15 parts of triethylenetetramine were added at an elevated temperature to the clear solution obtained in a) and stirring was continued until the solution was clear once more. Drying was then carried out at 120° C. and the product subsequently ground.

c) 100 parts of AP solution were stirred at 100° C. with 25 parts of a mixture of 40% of triethylenetetramine, 30% of tetraethylenepentamine and 30% of pentaethylenehexamine until a clear solution was formed. The product was then dried at 120° C. and ground similarly.

0.5 g pellets prepared from each of the three powders in a pelleting press were deposited in a sheet metal mould and put for 30 minutes into an oven preheated to 800° C. The sheet metal was then taken out of the oven and the volume of each of the intumescent foams formed was assessed. The following average expansions of the pellets were recorded in five successive tests:

Pellets from powder a): approx. 150% by volume
Pellets from powder b): approx. 350% by volume
Pellets from powder c): approx. 600% by volume.

A mechanically strong, ceramicised intumescent foam had been formed in every case, and in case c) it was particularly fine-pored and uniform.

What is claimed is:

1. An intumescence medium which contains an intumescence effective amount of at least one ammonium or amine salt of an acid phosphate of a metal of the 2nd or 3rd group of the periodic system of the elements.

2. An intumescence medium according to claim 1, which contains at least one ammonium salt of an acid phosphate of a metal of the 2nd or 3rd group of the periodic system of the elements.

3. An intumescence medium according to claim 1, which contains at least one amine salt of an acid phosphate of a metal of the 2nd or 3rd group of the periodic system of the elements.

4. An intumescence medium according to claim 1, which contains as a metal of the 2nd or 3rd group of the periodic system magnesium, calcium, zinc or aluminum.

5. An intumescence medium according to claim 1, which contains as ammonium or amine salt of an acid phosphate of a metal of the 2nd or 3rd group of the periodic system of the elements, at least one salt of the idealized composition of the formula (I)

$$Me^n(OPO(OH)_2)_n \cdot xnA \cdot yH_2O \qquad (I)$$

in which
Me denotes a metal of the 2nd or 3rd group of the periodic system of the elements,
n denotes the valency of Me,
x denotes a numerical value between 0.1 and 6,
A denotes ammonia, amine or mixtures thereof and
y denotes an integer from 0 to 12.

6. An intumescence medium according to claim 3, which contains an amine salt, the amine of the salt being at least one amine selected from the group consisting of a mono-, di-, tri- and polyalkylamine having alkyl or alkylene groups each containing 1° to 20° C. atoms.

7. An intumescence medium according to claim 3, which contains an amine salt, the amine of the salt being at least one amine selected from the group consisting of ethanolamine, ethylenediamine, and a polyethylenepolyamine having 3 to 7 N atoms.

8. An intumescence medium according to claim 3, additionally containing an ammonium salt of acid phosphate of a metal of the 2nd or 3rd group of the periodic system of the elements.

9. An intumescence medium according to claim 2, in which the phosphate is derived from an acid selected from the group consisting of orthophosphoric acid, pyrophosphoric acid, polyphosphoric acid, phosphorous acid and phosphinic acid.

10. An intumescence medium according to claim 2, which is additionally combined with an intumescence composition based on a polyalcohol, with at least one of swellable mica, graphite, a silicates, a borate and a synthetic borosilicates.

11. In the preparation of an impregnation mortar, cement, coating, fire-preventive glazing, fire-extinguishing powders, thermoplastic, clipboards, glass wool moulding, mineral wool moulding, special glass or foam, employing an intumescence medium, the improvement which comprises employing as said medium an intumescence medium according to claim 1.

12. A composition comprising swellable graphite and an intumescence medium which contains an intumescence effective amount of at least one ammonium or amine salt of an acid phosphate of a metal of the 2nd or 3rd group of the periodic system of the elements.

13. A moulding including an intumescence medium which contains at least one ammonium or amine salt of an acid phosphate of a metal of the 2nd or 3rd group of the periodic system of the elements of the idealized composition of the formula (I)

$$Me^n(OPO(OH)_2)_n \cdot xnA \cdot yH_2O \qquad (I),$$

in which
Me denotes a metal of the 2nd or 3rd group of the periodic system of the elements,
n denotes the valency of Me,
x denotes a numerical value between 0.1 and 6,
A denotes ammonia, amine or mixtures thereof and
y denotes an integer from 0 to 12.

* * * * *